Figure 1:
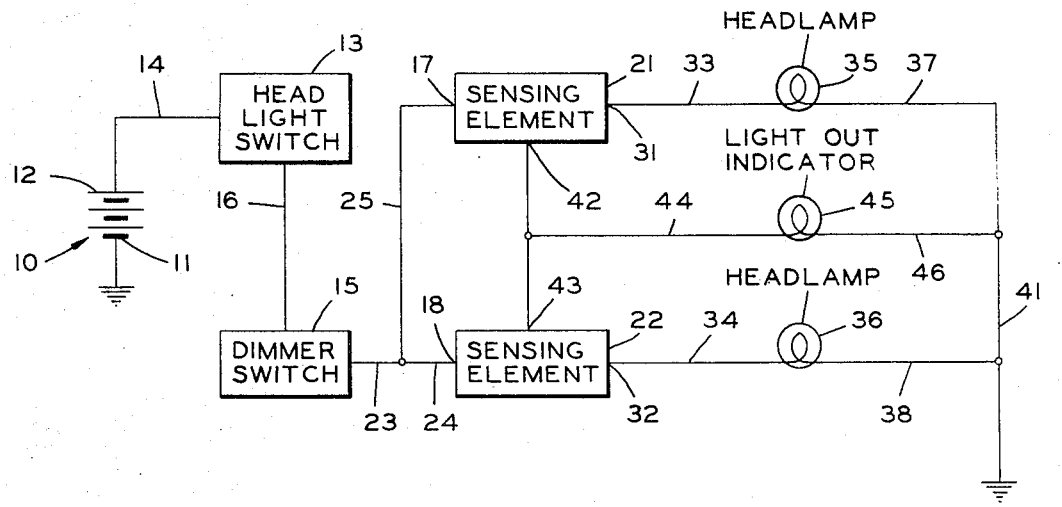

Dec. 20, 1966    R. G. MARSHALL    3,293,489
HEADLAMP OUTAGE INDICATOR
Filed Nov. 19, 1964

RICHARD G. MARSHALL
INVENTOR.

BY John R. Faulkner
Keith L. Zerschling
ATTORNEYS

3,293,489
HEADLAMP OUTAGE INDICATOR
Richard G. Marshall, Huntsville, Ala., assignor to The Ford Motor Company, Dearborn, Mich., a corporation of Delaware
Filed Nov. 19, 1964, Ser. No. 412,525
2 Claims. (Cl. 315—83)

This invention relates to a headlamp outage indicator for an automotive vehicle, and more particularly to such an indicator in which current to the headlamp flows through a bimetallic heater element that will engage a contact connected to an outage indicator lamp when the bimetal element is below operating temperature brought about by this current.

In automotive vehicles, there is a need to provide an indication to a vehicle operator when any one of the headlamps in the vehicle is burned out or rendered inoperative. It often occurs that a vehicle driver will drive a vehicle for a number of miles without realizing that a headlamp failure has occurred. This is a dangerous situation, and it may be the cause of serious head-on accidents due either to improper illumination of the roadway or to the side of the vehicle on which the lamp is located being unilluminated and hence not seen by the operator of an oncoming vehicle.

The present invention provides a means for indicating when a vehicle headlamp has burned out. It does this through a bimetal sensing element that carries the current directed to the headlamp. An indicator lamp is connected to a contact positioned adjacent the bimetal element, and when the current to the headlamp has brought the bimetal element to operating temperature, it will be out of engagement with this contact so that the indicator lamp is unenergized. If the headlamp should burn out, the bimetal element will cool and the indicator lamp will be energized from the source of electrical energy of the vehicle through the bimetal element to indicate that the lamp has burned out. It can be appreciated that this system also provides a checkout of the system when the headlamp is initially energized, since the indicator lamp will be energized for a brief period of time through the bimetal element until this element has come up to operating temperature and has moved away from the contact connected to the indicator element.

The present invention thus provides a very compact, inexpensive, and simplified headlamp outage indicator in which current both to the headlamps and to the outage indicator lamp is carried through a movable bimetal element.

An object of the present invention is the provision of a novel, uncomplicated, and inexpensive headlamp outage indicator for an automotive vehicle.

Another object of the invention is the provision of a new and novel headlamp outage indicator for an automotive vehicle in which a bimetal element is employed that furnishes a path for both the current to the headlamp and the current to the headlamp outage indicator lamp.

Figure 2:
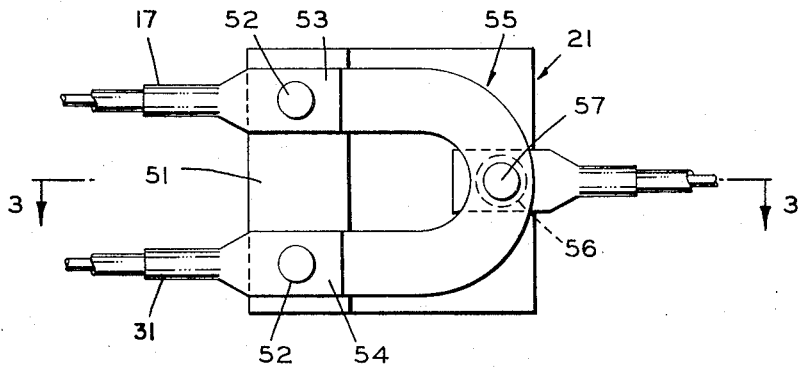

Other objects and attendant advantages of the invention will become more fully apparent as the specification is considered in connection with the attached drawings, in which:

FIGURE 1 is a circuit diagram of the invention;
FIGURE 2 is a plan view of the sensing element of the invention, and
FIGURE 3 is a sectional view taken along the lines 3—3 of FIGURE 2.

Referring now to the drawings in which like reference numerals designate like parts throughout the several views thereof, there is shown in FIGURE 1 a source of electrical energy or battery 10 having a negative terminal 11 connected to ground. The positive terminal 12 of the source of electrical energy or storage battery 10 is connected to headlight switch 13 through lead 14, and headlight switch 13 is in turn connected to a dimmer switch 15 through lead 16.

The dimmer switch 15 is connected to terminals 18 and 17 of two sensing elements 21 and 22 through lead 23 and leads 24 and 25 respectively. The second terminals 31 and 32 of the sensing elements 21 and 22 respectively are connected through leads 33 and 34 to headlamps 35 and 36. These headlamps are in turn connected to ground through leads 37 and 38 and common lead 41. Each of the sensing elements 21 and 22 has a third terminal indicated by the numeral 42 in sensing element 21 and by the numeral 43 in sensing element 22. These two terminals 42 and 43 are connected through lead 44 to one terminal of a headlamp outage indicator lamp 45. The other terminal of headlamp outage indicator lamp 45 is connected to ground through lead 46 and common lead 41.

Figure 3:
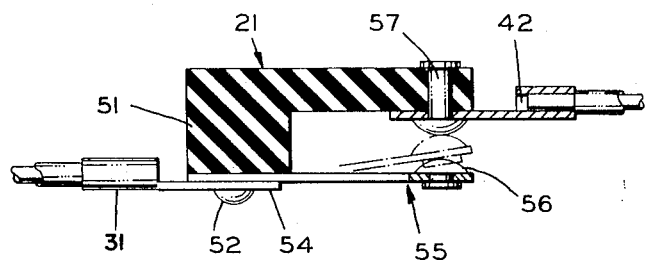

The sensing elements 21 and 22 are identical and one of them, sensing element 21, is shown in FIGURES 2 and 3. Referring to FIGURE 2, the terminals 17 and 31 are shown connected to an insulator block 51 by suitable fastening means 52. These fastening means also secure the ends 53 and 54 of a U-shaped bimetallic circuit element 55 to the insulator block 51 and to the terminals 17 and 31. The central portion of the U-shaped bimetallic circuit element 55 is capable of flexing, as shown in FIGURE 3, and it has a central contact 56 positioned therein that is adapted to engage a contact 57 on the insulator block 51 when the U-shaped bimetallic circuit element 55 is in the dotted position shown in FIGURE 3. The contact 57 is connected to terminal 42 of the sensing element 21 that in turn is connected through the lead 44 to the headlamp outage indicator lamp 45.

The U-shaped bimetallic circuit element 55 is so designed that when there is no current flowing through it or when it has not come up to operating temperature after initiation of current, the contact 56 will be positioned in engagement with the contact 57. When the circuit element 55 has come up to operating temperature, it will flex into the position shown in the solid line of FIGURE 3 so that the contact 56 is out of engagement with the contact 57.

In operation, when the headlamp light switch 13 is turned on and the dimmer switch 15 is positioned to energize the filaments of headlamps 35 and 36, whether this be high beam or low beam, current will flow from the source of electrical energy 10 through the headlight switch 13, through the dimmer switch 15, to terminals 17 and 18 of the sensing elements 21 and 22 respectively.

Referring now to FIGURES 2 and 3 which describe sensing element 21, current will flow from the terminal 17 through the bimetal sensing element 55 and out terminal 31, and then to the headlamp 35. At this instant current will also flow from the terminal 17 through half of the U-shaped bimetal circuit element 55, through contact 56, contact 57, and lead 44 to light the headlamp outage indicator lamp 45 since the U-shaped bimetallic circuit element 55 will be in the position shown by the dotted line in FIGURE 3 in which contacts 56 and 57 are in engagement. When the U-shaped bimetallic circuit element 55 comes up to operating temperature after a very short period of time due to the heat generated in it by the flow of current to the headlamp 35, it will flex or move into the position shown by the solid lines of FIGURE 3 thereby moving contacts 56 and 57 out of engagement and de-energizing the headlamp outage indicator lamp 45. This action provides a prove-out for the headlamp outage indicator system of the invention since if everything is in proper operating order the headlamp outage indicator lamp 45 will be energized for a short time period when the headlamps 35 and 36 are initially turned on.

Should the headlamp 35 burn out or the circuit from the source of electrical energy through the headlamp 35 be interrupted, current will no longer flow through the U-shaped bimetal circuit element 55. It will, therefore, cool and move into the position in which the contacts 56 and 57 are in engagement. This will energize the headlamp outage indicator lamp 45 through the terminal 17, half of the U-shaped bimetallic circuit element 55, contact 56, contact 57, terminal 42 and lead 44, thereby indicating to the vehicle operator that a headlamp has burned out or has ceased to function due to an open circuit of some type. The current through the half of the U-shaped bimetallic circuit element 55 between terminal 17 and contact 56 and the outage indicator lamp 45 will be insufficient to heat the U-shaped bimetallic circuit element 55 to an extent that contact 56 moves out of engagement with contact 57.

In describing the operation, it is apparent that the same operation is present in relation to the circuit element 22 and the headlamp 36 since the sensing element 22 is identical to sensing element 21 and the headlamp 36 is identical to the headlamp 35.

In a complete automotive system, it may be desirable to provide a sensing element for each lamp filament, or as shown here, it may be only desirable to employ it for low-beam headlamps when these are used in a four headlamp system such as are used in many of the modern day automotive vehicles.

It can be appreciated that the U-shaped bimetallic circuit element 55 not only provides the circuit path for the current flowing from the source of electrical energy 10 to the headlamps 35 or 36 as the case may be, but that it also serves as a path for the current from the source of electrical energy 10 to the headlamp outage indicator lamp 45.

The present invention thus provides an inexpensive, compact, and reliable headlamp outage indicator system for an automotive vehicle incorporating a prove-out feature that energizes the headlamp outage indicator lamp for a short period of time after the headlamps have been energized if the system is functioning properly.

It is to be understood that this invention is not to be limited to the exact construction shown and described, but that various changes and modifications may be made without departing from the spirit and scope of the invention as defined in the appended claims.

What is claimed is:

1. In a system for indicating a burned out condition of a headlamp the combination comprising, a source of electrical energy, a headlamp, a sensing element coupling at all times said source of electrical energy with said headlamp, said sensing element including a first terminal coupled to said source of electrical energy and a second terminal connected to said headlamp, a U-shaped bimetal element having one end connected to and anchored at said first terminal and having the other end connected to and anchored at said other terminal, a central contact positioned to engage the central portion of said U-shaped bimetal element when there is no current flow through said element to said headlamp, and an indicator lamp connected to said central contact.

2. In a system for indicating a burned out condition of a headlamp the combination comprising, a source of electrical energy, a headlamp, an indicator lamp, and a sensing element coupling said source of electrical energy, said headlamp and said indicator lamp for energizing said indicator lamp from said source of electrical energy when said headlamp is initially energized or has burned out, said sensing element including a U-shaped bimetal element having a first end connected at all times to said source of electrical energy and a second end connected at all times to said headlamp, said U-shaped bimetal element having a movable middle portion and having said ends anchored, a stationary contact positioned adjacent said movable portion and connected to said indicator lamp, the central portion of said U-shaped bimetal element being in engagement with said contact when there is no current through said headlamp and said U-shaped bimetal element, the heat generated by current flow in said U-shaped bimetal element when said headlamp draws current moving the middle portion of said U-shaped bimetal element out of engagement with said contact whereby said indicator lamp will be energized when said headlamp is burned out or is initially energized.

References Cited by the Examiner
UNITED STATES PATENTS

| | | | |
|---|---|---|---|
| 1,994,620 | 3/1935 | Putt | 315—73 |
| 3,047,771 | 7/1962 | Clark | 315—83 |

JOHN W. HUCKERT, *Primary Examiner.*

J. D. CRAIG, L. ZALMAN, *Assistant Examiners.*